United States Patent
Hamada (10) Patent No.: US 8,239,328 B2
(45) Date of Patent: Aug. 7, 2012

(54) INFORMATION PROCESSING APPARATUS, PRINT CONTROL APPARATUS, PRINTED CONTROL SYSTEM

(75) Inventor: Noboru Hamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 10/582,218

(22) PCT Filed: Feb. 22, 2005

(86) PCT No.: PCT/JP2005/003253
§ 371 (c)(1),
(2), (4) Date: Jun. 8, 2006

(87) PCT Pub. No.: WO2005/083927
PCT Pub. Date: Sep. 9, 2005

(65) Prior Publication Data
US 2007/0124243 A1    May 31, 2007

(30) Foreign Application Priority Data

Feb. 27, 2004   (JP) ................................. 2004-053294

(51) Int. Cl.
*G06F 21/00*    (2006.01)
(52) U.S. Cl. .......................................... 705/54; 705/64
(58) Field of Classification Search .................... 705/64,
705/51, 57, 67, 75, 54; 726/2, 4, 26, 28
See application file for complete search history.

(56) References Cited

U.S. PATENT DOCUMENTS

| | | | |
|---|---|---|---|
| 5,796,839 A | 8/1998 | Ishiguro | |
| 6,360,320 B1* | 3/2002 | Ishiguro et al. | 713/164 |
| 6,378,070 B1* | 4/2002 | Chan et al. | 713/155 |
| 7,003,667 B1 | 2/2006 | Slick et al. | |
| 2002/0042884 A1* | 4/2002 | Wu et al. | 713/201 |
| 2002/0131593 A1* | 9/2002 | Parry | 380/51 |

FOREIGN PATENT DOCUMENTS

| | | |
|---|---|---|
| JP | 5-167575 | 7/1993 |
| JP | 05-327748 | 12/1993 |
| JP | 10-003256 | 1/1998 |
| JP | 11-296327 | 10/1999 |
| JP | 2001-105690 | 4/2001 |
| JP | 2001-186358 | 7/2001 |
| JP | 2002-353965 | 12/2002 |
| JP | 2003-308194 | 10/2003 |

OTHER PUBLICATIONS

White, Ron, "How Computers Work", Millennium Ed., Que Corporation, Indianapolis, IN, 1999.*
International Preliminary Report on Patentability for corresponding PCT Application No. PCT/JP2005/003253 dated Mar. 30, 2006.

* cited by examiner

*Primary Examiner* — Chrystina Zelaskiewicz
(74) *Attorney, Agent, or Firm* — Fitzpatrick, Cella, Harper & Scinto

(57) ABSTRACT

An information processing apparatus, which encrypts print data (PDL), receives a personal identification code (PIN) input by a user, generates a random number (rnd), encrypts the generated random number by using the personal identification code or an encryption key generated based on the personal identification code, converts the personal identification code by using a predetermined function, and encrypts print data by using the random number as an encryption key, thereby maintaining security in the printing.

7 Claims, 6 Drawing Sheets

INFORMATION PROCESSING APPARATUS, PRINT CONTROL APPARATUS, PRINTED CONTROL SYSTEM

TECHNICAL FIELD

The present invention relates to an encryption print technique which, in case of transmitting a print job from a host such as a personal computer or the like to a print device such as a printer or the like through a network, encrypts print job data and then transmits the encrypted data to protect the data from wiretap and falsification on the way.

BACKGROUND ART

In a system that print data is transmitted from a host such as a personal computer or the like to a printer and then printed, there is a potential risk that the print data is wiretapped or falsified on its transmission route.

Moreover, after the print data is received by the printer, if the received data is automatically printed on a recording medium and the data-printed recording medium is automatically discharged as it always has been in the past, there is a potential risk that an attacker (that is; a person who acts maliciously) might take away an output printed material on the printer.

To cope with these risks, it is necessary to improve the system. More specifically, in the improved system, a job is first encrypted, the encrypted job is transmitted to the printer, and the transmitted job is stored in the printer as it is. Subsequently, a user walks up to the printer and confirms the job stored in the printer, and then the stored job is decoded (or decrypted) and printed for the first time.

Incidentally, in a case where the plural jobs are stored and held as a print queue in the printer, the user has to correctly identify or discriminate only the user's own job from among the stored jobs. However, since the stored jobs themselves have been encrypted, it is impossible for the user to use a conventional method of scanning all the stored jobs to extract only the job of which the header portion includes an ID corresponding to a user's own ID.

Figure 6:
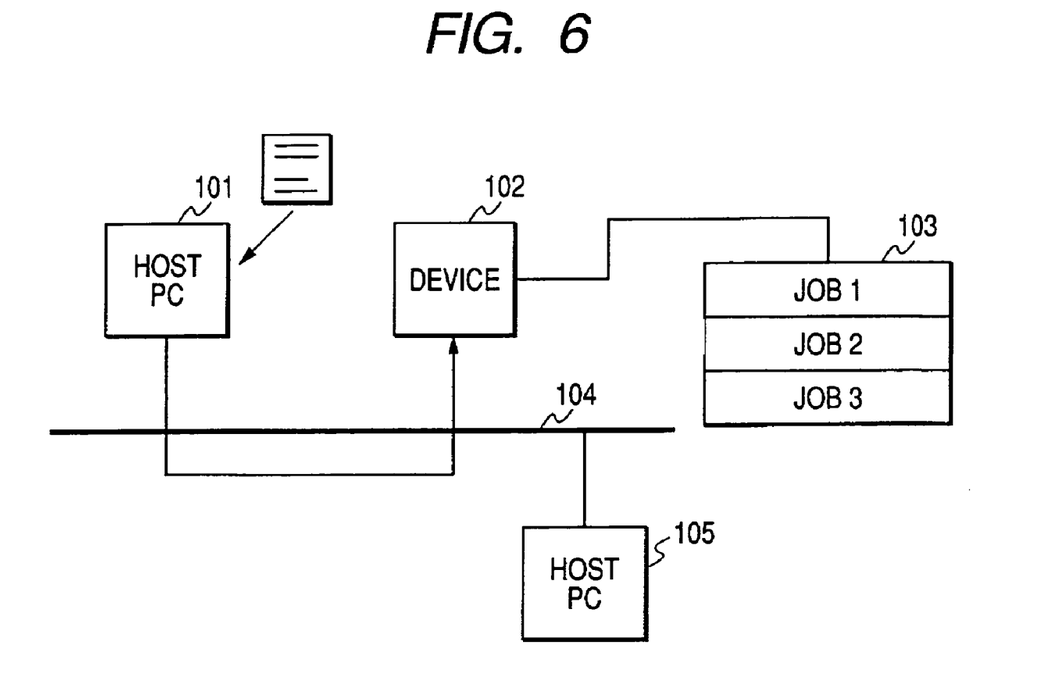
FIG. 6 is the conceptional diagram showing the job identification problem in the encrypted printing technique.

FIG. 6 is a schematic diagram conceptually showing such a problem as described above. That is, as shown in FIG. 6, host PC's (personal computers) 101 and 105 and a device 102 having a print function are mutually connected to others through a network 104. Here, it is assumed that three encrypted print jobs (jobs 1 to 3) in all are transmitted from the host PC's 101 and 105 to the device 102. In this case, the device 102 holds these encrypted jobs as it is in a job holding area 103 of the device 102 without executing them.

Here, it is further assumed that a certain user A (not shown) who uses the host PC 101 walks up to the device 102 and directly releases the user's own encrypted print job held therein with a view to start printing.

In this connection, a problem in this case is how to recognize which of the three jobs 1 to 3 is the user's own job.

More specifically, since the stored jobs have been encrypted, it is impossible to use a method of extracting from among the stored jobs the job of which the user identifier embedded in the header thereof corresponds to the user's ID. On another front, a method of not encrypting only the portion of the user identifier is devised. However, if this method is used, a secret of the fact that the user A executes the printing cannot be maintained, whereby it is undesirable for a security reason.

As just described, in the case where the plural jobs have been stored and held in the printer, some kind or another method of identifying the job of the relevant user from among the stored jobs is necessary so as to correctly print the relevant job.

Incidentally, as the related background art concerning identification of the job stored and held in the printer, there is a method as described in, e.g., Japanese Patent Application Laid-Open No. 2001-105690 (hereinafter called a patent document 1).

Figure 7:
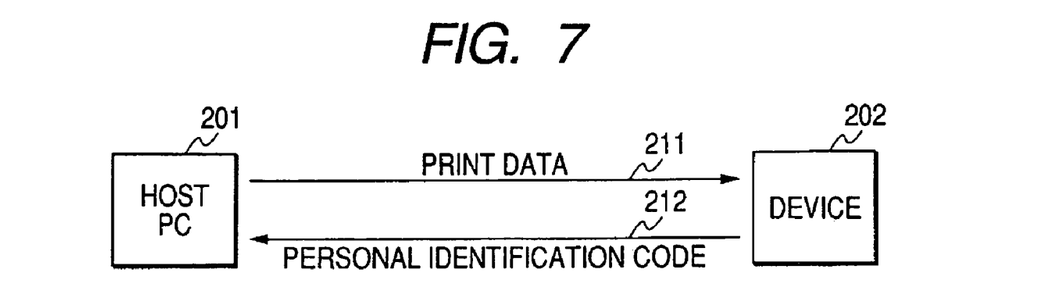
FIG. 7 is the conceptional diagram showing one example of the job identification method according to the related background art.

FIG. 7 is a conceptional diagram for simply explaining the method described in the patent document 1. That is, according to the method of the patent document 1, a host PC 201 transmits print data 211 to a device 202. Then, the device 202 which received the print data 211 generates a personal identification code 212 for uniquely identifying the received print data 211, and then transmits the generated personal identification code 212 to the host PC 201. After then, a user who received the personal identification code 212 from the device 202 on the side of the host PC 201 moves to the device 202 and inputs the received personal identification code 212 in the device 202 to identify the user's own job. Subsequently, the user acquires the output result from the user's own job.

However, in the method of the patent document 1, it is necessary to execute an unsafe procedure that a number for protecting the encrypted print job is notified from the device side to the host side on the way.

Moreover, the patent document 1 is silent about job encryption for preventing wiretap. Furthermore, even if a print job has been encrypted, an attacker might attempt to damage print data or falsify the print job. Here, it should be noted that an attacker's purpose of falsification of the print job is to attain wasting of paper and the like on the device side by causing the device side to output a large number of meaningless print results. In any case, although it is further necessary to cope with such attack, the patent document 1 is also silent about this.

DISCLOSURE OF THE INVENTION

An object of the present invention is to solve such conventional problems as described above, eliminate necessity of executing an unsafe procedure that an ID number for identifying a job is notified from a print device to a host, and maintain security in printing.

Another object of the present invention is to provide an information processing apparatus which comprises:

a code reception unit adapted to receive a personal identification code input by a user;

a random number generation unit adapted to generate a random number;

a random number encryption unit adapted to encrypt the random number generated by the random number generation unit, by using the personal identification code or a key based on the personal identification code as an encryption key;

a code conversion unit adapted to convert the received personal identification code by using a predetermined function; and a print data encryption unit adapted to encrypt print data by using the random number as an encryption key.

Here, for example, it is preferable that the code conversion unit converts the personal identification code by using a one-way function.

Here, for example, it is preferable that the code conversion unit generates a hash value of the personal identification code.

Here, for example, it is preferable that the information processing apparatus further comprises a transmission unit adapted to transmit the encrypted random number, the converted personal identification code and the encrypted print data.

Another object of the present invention is to provide a print control apparatus which comprises:

a reception unit adapted to receive an encrypted random number, a first personal identification code subjected to predetermined conversion, and encrypted print data;

a code reception unit adapted to receive a second personal identification code input by a user;

a code conversion unit adapted to convert the received second personal identification code by using a predetermined function;

a judgment unit adapted to judge whether or not the converted first personal identification code is the same as the converted second personal identification code;

a random number decryption unit adapted to, in a case where the converted first and second personal identification codes are the same, decrypt the encrypted random number by using the second personal identification code or a key based on the second personal identification code as a decryption key; and a print data decryption unit adapted to, in the case where the converted first and second personal identification codes are the same, decrypt the encrypted print data by using the decrypted random number as a decryption key.

Here, for example, it is preferable that the code conversion unit converts the second personal identification code by using a one-way function.

Here, for example, it is preferable that the code conversion unit generates a hash value of the second personal identification code.

Here, for example, it is preferable that the print control apparatus further comprises a print processing unit adapted to execute a print process of the decrypted print data.

Another object of the present invention is to provide a print control system which includes an information processing apparatus and a print control apparatus, wherein the information processing apparatus comprises:

a first code reception unit adapted to receive a first personal identification code input by a user;

a random number generation unit adapted to generate a random number;

a random number encryption unit adapted to encrypt the generated random number by using the first personal identification code or a key based on the first personal identification code as an encryption key;

a first code conversion unit adapted to convert the received first personal identification code by using a predetermined function;

a print data encryption unit adapted to encrypt print data by using the random number as an encryption key; and a transmission unit adapted to transmit the encrypted random number, the converted first personal identification code and the encrypted print data to the print control apparatus, and the print control apparatus comprises:

a reception unit adapted to receive the encrypted random number, the converted first personal identification code and the encrypted print data from the information processing apparatus;

a second code reception unit adapted to receive a second personal identification code input by the user;

a second code conversion unit adapted to convert the received second personal identification code by using a predetermined function;

a judgment unit adapted to judge whether or not the first personal identification code converted by the first code conversion unit is the same as the second personal identification code converted by the second code conversion unit;

a random number decryption unit adapted to, in a case where the judgment unit judges that the converted first and second personal identification codes are the same, decrypt the encrypted random number by using the second personal identification code or a key based on the second personal identification code as a decryption key; and a print data decryption unit adapted to, in the case where the judgment unit judges that the converted first and second personal identification codes are the same, decrypt the encrypted print data by using the decrypted random number as a decryption key.

Here, for example, it is preferable that the print control apparatus further comprises a print processing unit adapted to execute a print process of the decrypted print data.

Another object of the present invention is to provide an information processing method comprising the steps of:

receiving a personal identification code input by a user;

generating a random number;

encrypting the generated random number by using the personal identification code or a key based on the personal identification code as an encryption key;

converting the personal identification code by using a predetermined function; and encrypting print data by using the random number as an encryption key.

Here, for example, it is preferable that the information processing method further comprises the step of transmitting the encrypted random number, the converted personal identification code and the encrypted print data.

Another object of the present invention is to provide a print control method comprising the steps of:

receiving an encrypted random number, a first personal identification code subjected to predetermined conversion, and encrypted print data;

receiving a second personal identification code input by a user;

converting the received second personal identification code by using a predetermined function;

judging whether or not the converted first personal identification code is the same as the converted second personal identification code;

in a case where it is judged that the converted first and second personal identification codes are the same, decrypting the encrypted random number by using the second personal identification code or a key based on the second personal identification code as a decryption key; and in the case where it is judged that the converted first and second personal identification codes are the same, decrypting the encrypted print data by using the decrypted random number as a decryption key.

Here, for example, it is preferable that the print control method further comprises the step of executing a print process of the decrypted print data.

Another object of the present invention is to provide a computer program for causing a computer to execute an information processing method, comprising:

a code reception module for receiving a personal identification code input by a user;

a random number generation module for generating a random number;

a random number encryption module for encrypting the generated random number by using the personal identification code or a key based on the personal identification code as an encryption key;

a code conversion module for converting the received personal identification code by using a predetermined function; and a print data encryption module for encrypting print data by using the random number as an encryption key.

Another object of the present invention is to provide a computer program for causing a computer to execute a print control method, comprising:

a reception module for receiving an encrypted random number, a first personal identification code subjected to predetermined conversion, and encrypted print data;

a code reception module for receiving a second personal identification code input by a user;

a code conversion module for converting the received second personal identification code by using a predetermined function;

a judgment module for judging whether or not the converted first personal identification code is the same as the converted second personal identification code;

a random number decryption module for, in a case where it is judged that the converted first and second personal identification codes are the same, decrypting the encrypted random number by using the second personal identification code or a key based on the second personal identification code as a decryption key; and a print data decryption module for, in the case where it is judged that the converted first and second personal identification codes are the same, decrypting the encrypted print data by using the decrypted random number as a decryption key.

Another object of the present invention is to provide a computer-readable storage medium which stores a computer program for causing a computer to execute an information processing method, the computer program comprising:

a code reception module for receiving a personal identification code input by a user;

a random number generation module for generating a random number;

a random number encryption module for encrypting the generated random number by using the personal identification code or a key based on the personal identification code as an encryption key;

a code conversion module for converting the received personal identification code by using a predetermined function; and a print data encryption module for encrypting print data by using the random number as an encryption key.

Another object of the present invention is to provide a computer-readable storage medium which stores a computer program for causing a computer to execute a print control method, the computer program comprising:

a reception module for receiving an encrypted random number, a first personal identification code subjected to predetermined conversion, and encrypted print data;

a code reception module for receiving a second personal identification code input by a user;

a code conversion module for converting the received second personal identification code by using a predetermined function;

a judgment module for judging whether or not the converted first personal identification code is the same as the converted second personal identification code;

a random number decryption module for, in a case where it is judged that the converted first and second personal identification codes are the same, decrypting the encrypted random number by using the second personal identification code or a key based on the second personal identification code as a decryption key; and a print data decryption module for, in the case where it is judged that the converted first and second personal identification codes are the same, decrypting the encrypted print data by using the decrypted random number as a decryption key.

The above-described objects and other objects of the present invention will become apparent from the following description in conjunction with the accompanying drawings.

BEST MODE FOR CARRYING OUT THE INVENTION (First Embodiment)

Figure 1:
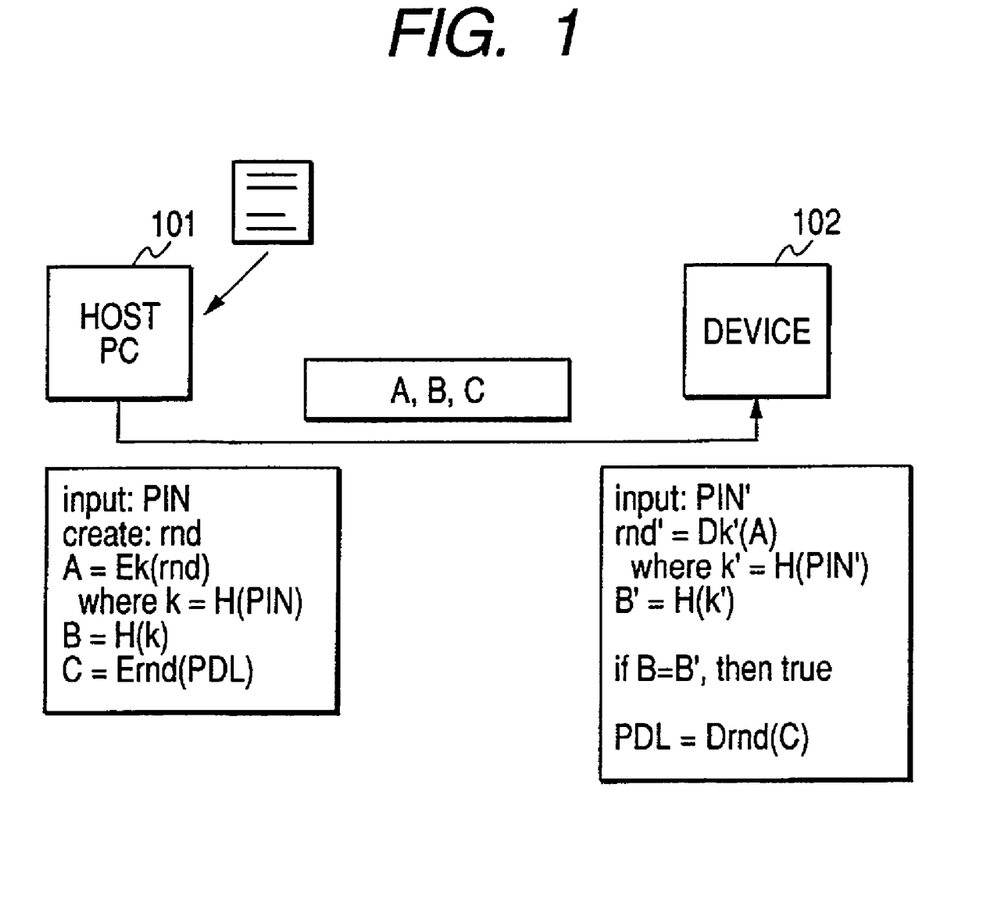
FIG. 1 is a diagram showing the principle of an encrypted printing method according to the embodiment of the present invention.
Figure 2:
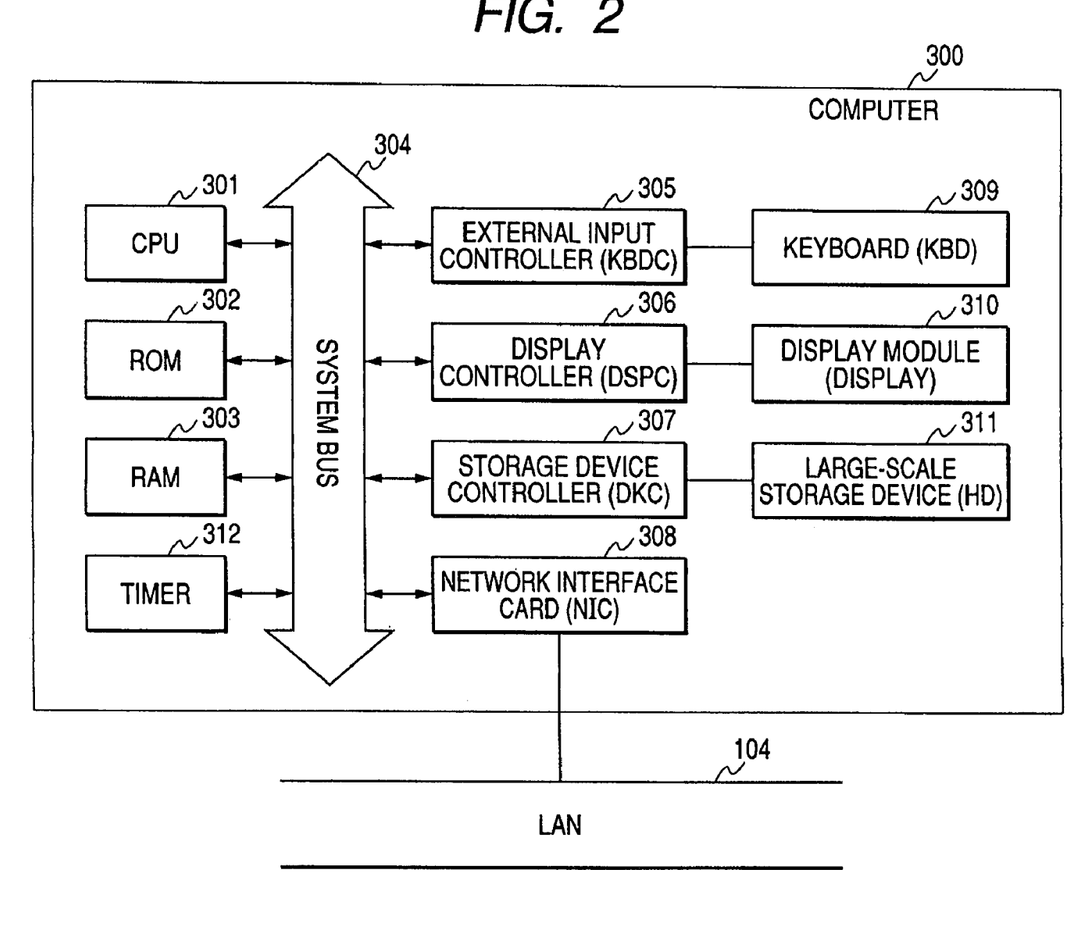
FIG. 2 is a block diagram showing the internal construction of a host PC or the internal construction of a print device, according to the embodiment.

FIG. 2 is a block diagram showing the internal construction of a general computer. Here, it should be noted that a host PC 101 or the controller unit of a print device 102 (shown in FIG. 1) according to the first embodiment of the present invention has the same construction.

In FIG. 2, numeral 300 denotes the entirety of a computer. Here, the computer 300 includes a CPU (central processing unit) 301 which executes software (i.e., a computer program) stored in a ROM (read only memory) 302 or a large-scale storage device 311 such as an HD (hard disk) or the like, whereby the CPU 301. totally controls respective devices and units through a connected system bus 304. Moreover, numeral 312 denotes a timer which is used when the CPU 310 executes the controlling.

Numeral 303 denotes a RAM (random access memory) which functions as a main memory, a working area and the like for the CPU 301, numeral 305 denotes an external input controller (or a keyboard controller (KBDC)) which controls inputting of various indications and instructions from various buttons, a keyboard (KBD) 309 and the like provided on the computer 300, and numeral 306 denotes a display controller (DISPC) which controls displaying on a display module (DISPLAY) 310.

Numeral 307 denotes a storage device controller (or a disk controller (DKC)) which controls accessing to the large-scale storage device 311 such as the HD or the like.

Numeral 308 denotes a network interface card (NIC) which bi-directionally exchanges data between the computer 300 and another network, a file server or the like through a LAN 104.

FIG. 6 is the schematic diagram showing an example of the construction of the encrypted print system according to the present embodiment. That is, as shown in FIG. 6, the host PC's 101 and 105 and the device (or a printer) 102 having the print function are mutually connected to others through the network 104. Here, it is assumed that three encrypted print jobs (the jobs 1 to 3) in all are transmitted from the host PC's 101 and/or 105 to the device 102. In this case, the device 102 holds these encrypted jobs as it is in the job holding area 103 of the device 102 without executing them. After then, a user executes a predetermined operation to the device 102, whereby the encrypted job is decrypted (or decoded) and printed.

The device 102 includes the controller unit as described above and a not-shown printer engine unit. Here, it should be noted that the controller unit and the printer engine unit may be integrated together into the device 102 or may be provided respectively as independent units.

FIG. 1 is the diagram showing an encryption method of print job data and an identification method of a job, both according to the present embodiment.

In the host PC 101, under the control of the CPU 301 (FIG. 2), a random number rnd is generated to encrypt the print job, and the generated random number rnd is used as an encryption key for encrypting PDL (page-description language) data. Here, the random number rnd is encrypted by using a hash value k of a PIN (personal identification number) code input by the user. Further, the hash value k is calculated, and the calculated hash value k is later used to identify the encrypted job on the side of the device 102. Incidentally, it should be noted that a character string may be used as a PIN in addition to the number.

Here, it is assumed that the encrypted PDL data is set as a value C, the hash value of PIN is set as a value k, the hash value of k is set as a value B, and the value acquired by encrypting the random number rnd by using the hash value k as an encryption key is set as a value A. With that, a set of the values A, B and C is transmitted from the side of the host PC 101 to the side of the device 102.

Then, in the device 102 which received the values A, B and C, the hash value of the PIN input by the user is calculated and the acquired value is set as a value k'. Subsequently, the hash value of the value k' is further calculated and the acquired value is set as a value B'. With that, it is judged whether or not the received job is the job of the user who input the relevant PIN, by judging whether or not the value B being a part of the received data is the same as the calculated value B'. Then, if it is judged that the transmitted job is the job of the user who input the relevant PIN, the received data is decrypted (or decoded) and printed.

Figure 3:
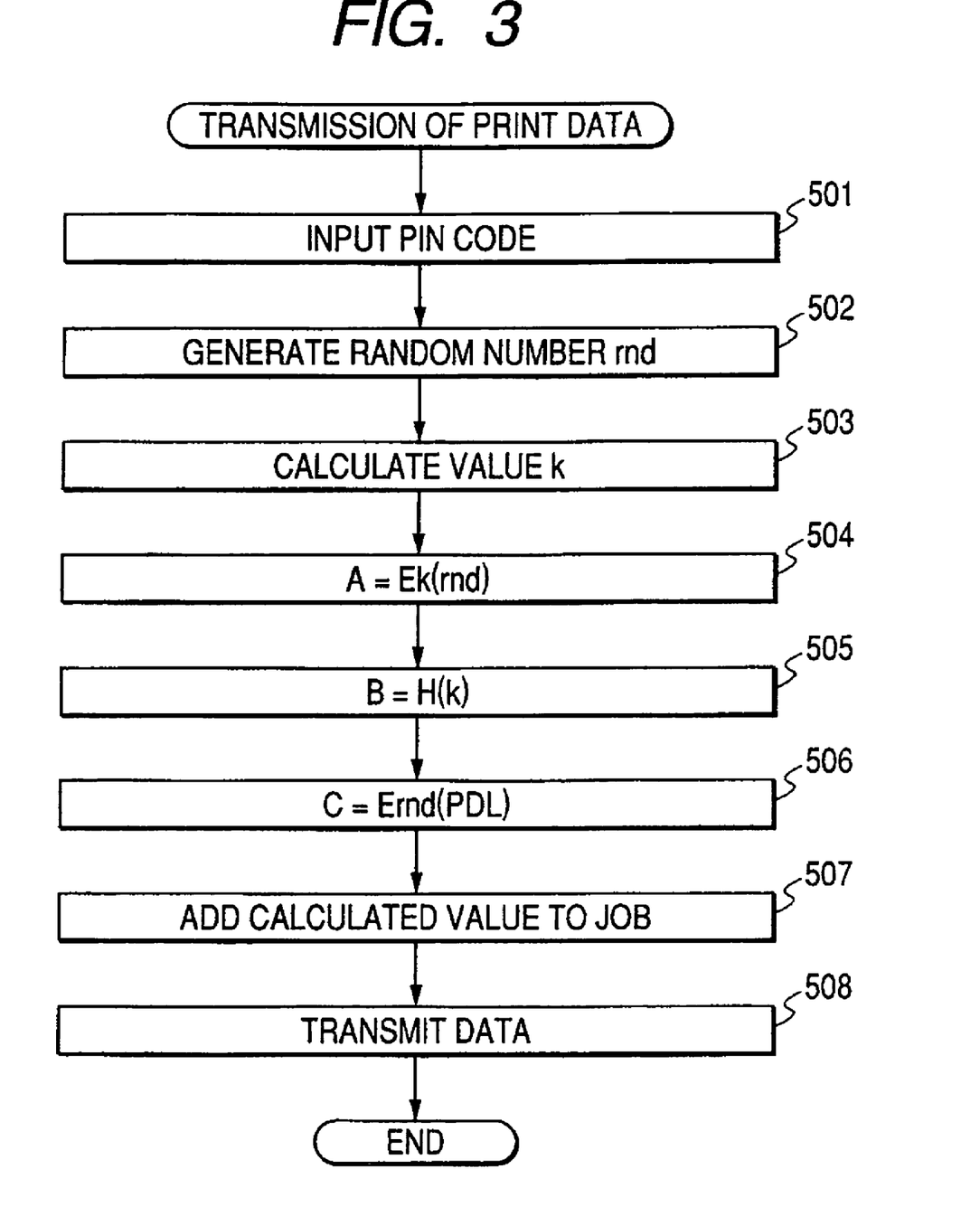
FIG. 3 is a flow chart showing the operation of the host PC according to the embodiment.

FIG. 3 is a flow chart showing a job encryption procedure on the side of the host PC 101 shown in FIG. 1.

It should be noted that the job encryption procedure shown in FIG. 3 is executed by the CPU 301 of the host PC 101. Moreover, as a premise of this procedure, it is assumed that data such as document data, text data, image data or the like to be printed is first converted by a printer driver module into data, i.e., PDL data, having a format capable being read by the printer, and then the converted data are sequentially transferred to the module which executes a procedure shown in FIG. 4.

In case of transmitting the print data, first, the KBDC 305 is controlled in a step 501 to receive the PIN code which is input by the user through the KBD 309. In a subsequent step 502, the random number rnd which is used to encrypt the PDL data in a later step is generated. In a subsequent step 503, an encryption key k which is used to further encrypt the encryption key which is used to encrypt the job is calculated based on the PIN code received in the step 501. In the present embodiment, it is assumed that the PIN code is input to a hash function such as MD5 (Message Digest 5), SHA-1 (Secure Hash Algorithm 1) or the like and the hash value acquired as the output of the hash function is used as the encryption key k. Then, in a subsequent step 504, the random number rnd which is used to encrypt the PDL data is encrypted by using the value k calculated in the step 503 as the encryption key, and the calculated value is set as the value A. Here, it should be noted that the PIN code itself may be used as the encryption key. In a subsequent step 505, the hash value of the value k calculated in the step 503 is further calculated, and the calculated value is set as the value B. Moreover, in a subsequent step 506, the PDL data for the printing is encrypted by using the random number rnd generated in the step 502 as the encryption key, and the calculated value is set as the value C. Then, in a subsequent step 507, the value A calculated in the step 504, the value B calculated in the step 505 and the value C calculated in the step 506 are stored in a lump in the buffer provided in the temporary memory area on the RAM 303 for the purpose of transmission. After that, in a subsequent step 508, the NIC 308 is controlled to transmit the transmission data provided in the step 507 to the device 102 through the LAN 104. After the data transmission ends, the buffer on the RAM 303 is released.

Incidentally, in the flow chart of FIG. 3, it may reverse the order of the process of the step 501 and the process of the step 502.

Figure 4:
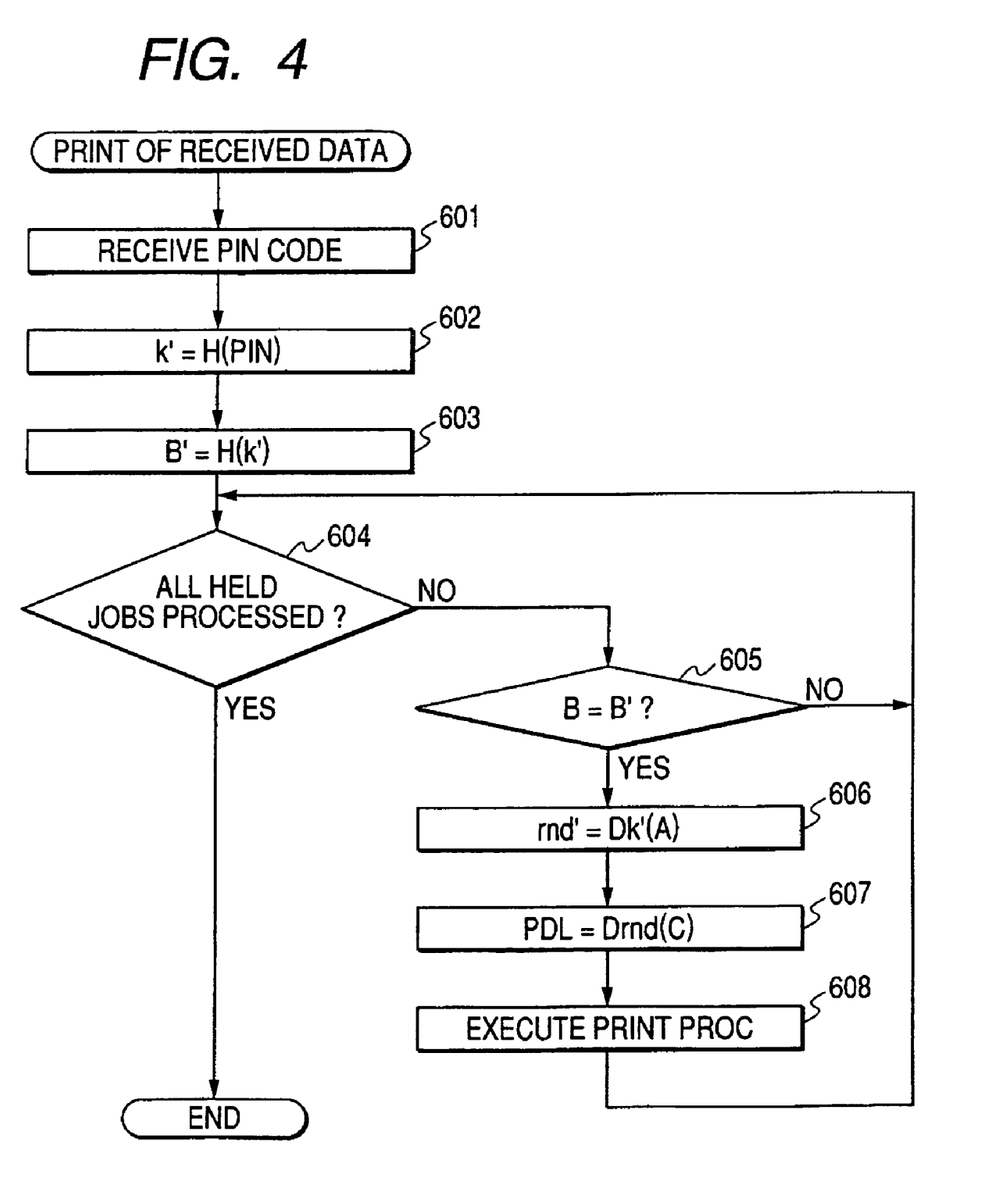
FIG. 4 is a flow chart showing the operation of the print device according to the embodiment.

FIG. 4 is the flow chart showing the job identification method and the job decryption (decoding) procedure on the side of the device 102 shown in FIG. 1. Here, it should be noted that the device 102 receives the above transmission data transmitted from the host PC 101.

Besides, it should be noted that the procedure shown in the flow chart of FIG. 4 is executed by the CPU 301 provided in the device 102.

In case of identifying and decrypting (decoding) the job, first, the KBDC 305 is controlled in a step 601 to receive the PIN code which is input by the user through the KBD 309. In a subsequent step 602, the hash value k' of the PIN code received in the step 601 is calculated. Then, in a subsequent step 603, the hash value of the value k' calculated in the step 602 is further calculated and the acquired value is set as the value B'. Next, in a subsequent step 604, it is judged whether or not the job identification process is executed to all the jobs held in the job holding area 103 (FIG. 6) of the device 102.

If it is judged that the job identification process is executed to all the jobs, the job decryption (decoding) procedure ends.

To the contrary, if it is judged that the job identification process is not yet executed to all the jobs, the flow advances to a step 605. In the step 605, the value B is extracted from the header portion of the process-target job, and it is then judged whether or not the extracted value B is the same as the value B' calculated in the step 603.

If it is judged that the values B and B' are the same, the flow advances to a step 606. In the step 606, the value A is extracted from the header portion of the job, and the decryption (decoding) process is executed by using the value k' calculated in the step 602 as the decryption key. Then, the acquired value is set as a value rnd'.

Incidentally, when the value acquired by encrypting the key rnd with use of the PIN code itself is set as the value A in the step 504 of FIG. 3, the decryption (decoding) process in the step 606 only has to be executed to the value A by using the PIN code input in the step 601 as the decryption key.

In a subsequent step 607, the encrypted PDL data C is extracted from the job, and the decryption (decoding) process is executed by using the value rnd' calculated in the step 606 as the decryption key. Then, the acquired value is set as the PDL data to be printed. Therefore, in a subsequent step 608, a print process is executed to the PDL data acquired in the step 607.

If the process in the step 608 ends, or if it is judged in the step 605 whether or not the extracted value B is not the same as the value B', the flow returns to the step 604 to continue the process to a next job.

Here, it should be noted that a program to be executed by the host PC 101 or the device 102 according to the present embodiment may be externally installed and then executed by the host PC 101 or the device 102. In that case, the present invention is applicable even in a case where the program is supplied to the host PC 101 or the device 102 through a storage medium such as a CD-ROM, a flash memory, a flexible disk or the like. Besides, the present invention is also applicable even in a case where an information group including the program is downloaded and supplied from an external storage medium to the host PC 101 or the device 102 through a network of an electronic mail, a personal computer communication or the like.

Figure 5:
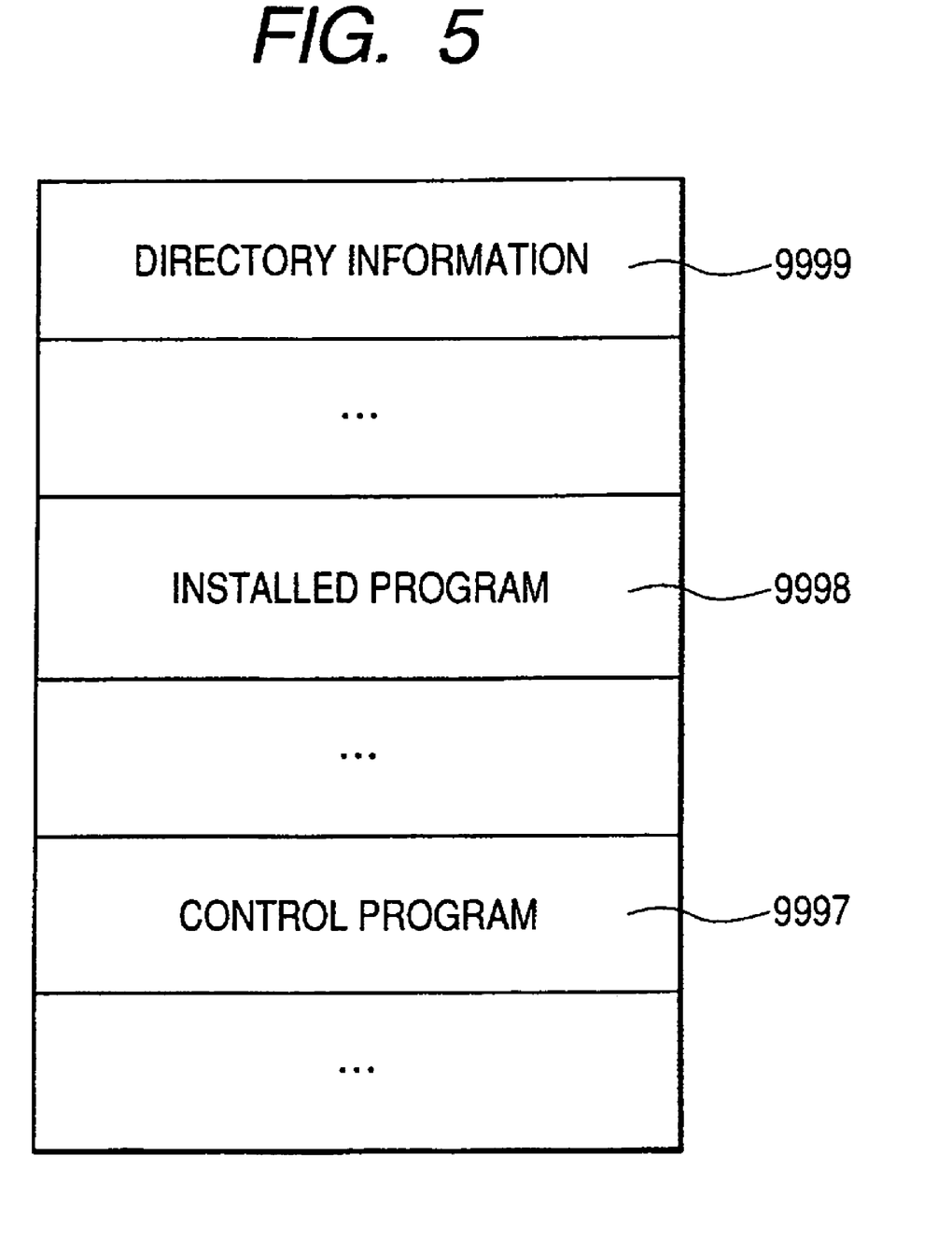
FIG. 5 is a diagram showing a memory map, in a storage medium, of software according to the embodiment.

FIG. 5 is a diagram showing a memory map of a CD-ROM being one example of the storage medium. In FIG. 5, numeral 9999 denotes an area where directory information has been stored, numeral 9998 denotes an area where installed programs have been stored, and numeral 9997 denotes an area where control programs of a print client or a network printer have been stored. Here, it should be noted that the directory information stored in the area 9999 indicates the area 9998 and the area 9997. In a case where the control program of the print client or the network printer is installed into the host PC 101 or the device 102, the installed program stored in the area 9998 is first loaded to the system and then executed by the CPU 301. Subsequently, by the installed program executed by the CPU 301, the control program of the print client or the network printer is read from the area 9997 where the control programs of the print client or the network printer have been stored, and the content of the ROM 302 is rewritten, or the control program is installed in the large-scale storage device 311. In that case, a simple mask ROM cannot be used as the ROM 302, that is, a rewritable ROM such as a flash ROM or the like should necessarily be used.

Incidentally, the present embodiment may be applied to a system or an integrated apparatus which consists of plural devices (for example, a host computer, an interface equipment, a reader, etc.), or to an apparatus which comprises a single device.

Moreover, it is needless to say that the object of the present invention can be achieved in a case where the storage medium storing the program codes of software to achieve the above functions of the present embodiment is supplied to a system or an apparatus and then a computer (or CPU or MPU) in the system or the apparatus reads and executes the program codes stored in the storage medium.

In that case, the program codes themselves read from the storage medium achieve the novel functions of the present invention, whereby the storage medium which stores these program codes constitutes the present invention.

As the storage medium for supplying the program codes, for example, a flexible disk, a hard disk, an optical disk, a magnetooptical disk, a CR-ROM, a CD-R, a CD-RW, a DVD-ROM, a magnetic tape, a nonvolatile memory card, a ROM, an EEPROM, a silicon disk or the like can be used.

Moreover, the present invention includes not only a case where the above functions of the present embodiment are realized by executing the program codes read by the computer, but also a case where an OS (operating system) or the like functioning on the computer executes a part or all of the actual process according to instructions of the program codes, whereby the above functions of the present embodiment are achieved by that process.

Furthermore, the above functions of the present embodiment can be achieved in a case where the program code read from the storage medium is once written in a memory provided in a function expansion board inserted in the computer or a function expansion unit connected to the computer, and then a CPU or the like provided in the function expansion board or the function expansion unit executes a part or all of the actual process according to the instructions of the program.

Incidentally, it is needless to say that the present invention is also applicable to a case where, from the storage medium which stores the program codes of software to achieve the above functions of the present embodiment, the program code is delivered to a demander through a communication line in the form of a personal computer communication or the like.

(Second Embodiment)

Hereinafter, the second embodiment of the present invention will be explained.

In the above first embodiment, the value which is acquired by the hash function with respect to the PIN code input by the user is used as the key which is used to further encrypt the encryption key rnd which is used to encrypt the PDL data. However, the present invention is not limited to such a method. That is, to achieve the above functions of the first embodiment, it is possible to use any one-way function which converts the PIN code and by which conformity of the converted values can be confirmed.

For example, the number of calculation to acquire the hash value is one in the first embodiment. However, it is possible to adopt a method of executing the calculation according to the hash function twice. That is, in this method, the output result acquired in the calculation by the hash function is again input to the hash function. In addition, it is possible to adopt a method of first calculating XOR (exclusive OR) of a predetermined number and the PIN code, calculating the hash value of the XOR result, and repeating this operation plural times.

Of course, in these methods, when the job is identified on the side of the device, it is necessary to adopt the same method of dealing with the PIN code as the method used on the side of the host PC.

As described above, in the first and second embodiments, the means for receiving the PIN code input by the user, the means for generating the random number, the means for encrypting the generated random number, the means for converting the received PIN code into the value which cannot be easily inferred, and the means for encrypting the print job data are provided on the host side.

Moreover, the means for receiving the PIN code input by the user, the means for judging the authenticity of the received encrypted job, the means for calculating the encryption key of the encrypted job, and the means for decrypting the encrypted print job are provided on the device side.

Therefore, it is possible to encrypt and transmit the print data without executing the unsafe procedure that the number for protecting the encrypted print job is notified from the device side to the host side. Moreover, it is possible on the device side to identify the job without executing the above unsafe procedure. In addition, it is possible to eliminate the risk that the print data is falsified on the way. That is, the ID for identifying the job is automatically generated as the random number, and the generated random number is encrypted, whereby high-level security such as falsification detection and the like can be maintained.

Here, it should be noted that the above first and second embodiments merely show the examples of concretization of the present invention. Thus, by these embodiments, the technical concept of the present invention must not be interpreted limitedly. In other words, widely different embodiments of the present invention can be made without departing from the spirit and scope thereof.

In conclusion, although the present invention has been described with reference to the preferred embodiments, it is to be understood that the present invention is not limited to these embodiments. That is, the present invention is intended to cover various modifications included within the spirit and scope of the appended claims.

This application claims priority from Japanese Patent Application No. 2004-053294 filed Feb. 27, 2004, which is hereby incorporated by reference herein.

The invention claimed is:

1. An information processing apparatus comprising:
a memory storing computer-executable instructions;
a processor that executes the computer-executable instructions stored in the memory, wherein the computer-executable instructions include the following:
a code reception unit programmed to receive a personal identification code, the personal identification code being input by a user of the information processing apparatus via an operation unit;
a random number generation unit programmed to generate a random number;
a code conversion unit programmed to convert the received personal identification code by using a first predetermined function;
a random number encryption unit programmed to encrypt the random number generated by said random number generation unit, by using the converted personal identification code for an encryption key;
the code conversion unit programmed to convert the converted personal identification code by using a second predetermined function, to yield a twice-converted personal identification code;
a print data encryption unit programmed to encrypt print data by using the random number for an encryption key;
a transmission unit programmed to transmit the encrypted random number, the twice-converted personal identification code and the encrypted print data to an external print control apparatus;
wherein both the converted personal identification code used by the random number encryption unit and the random number used by the print data encryption unit are internally generated and supplied without outside assistance.

2. An information processing apparatus according to claim 1, wherein said code conversion unit converts the personal identification code by using a one-way function.

3. An information processing apparatus according to claim 2, wherein said code conversion unit generates a hash value of the personal identification code.

4. A print control system which includes an information processing apparatus and a print control apparatus, wherein said information processing apparatus comprises:
a first code reception unit programmed to receive a first personal identification code, the first personal identification code being input by a user of the information processing apparatus via a first operation unit;
a random number generation unit programmed to generate a random number;
a code conversion unit programmed to convert the received first personal identification code by using a first predetermined function;
a random number encryption unit programmed to encrypt the generated random number by using the converted first personal identification code for an encryption key;
the code conversion unit programmed to convert the converted first personal identification code by using a second predetermined function, to yield a twice-converted first personal identification code;
a print data encryption unit programmed to encrypt print data by using the random number for an encryption key; and
a transmission unit programmed to transmit the encrypted random number, the twice-converted first personal identification code and the encrypted print data to said print control apparatus, and
said print control apparatus comprises:
a reception unit programmed to receive the encrypted random number, the twice-converted first personal identification code and the encrypted print data from said information processing apparatus;
a second code reception unit programmed to receive a second personal identification code, the second personal identification code being input by a user of the print control apparatus via a second operation unit;
a second code conversion unit programmed to convert the received second personal identification code by using a third predetermined function;
a judgment unit programmed to judge whether or not the twice-converted first personal identification code is the same as the converted second personal identification code;
a random number decryption unit programmed to, in a case where said judgment unit judges that the twice-converted first personal identification code and converted second personal identification code are the same, decrypt the encrypted random number by using the second personal identification code for a decryption key; and
a print data decryption unit programmed to, in the case where said judgment unit judges that the twice-converted first personal identification code and converted second personal identification code are the same, decrypt the encrypted print data by using the decrypted random number for a decryption key;
wherein both the converted first personal identification code used by the random number encryption unit and the random number used by the print data encryption unit are internally generated and supplied without outside assistance.

5. A print control system according to claim 4, wherein said print control apparatus further comprises a print processing unit programmed to execute a print process of the decrypted print data.

6. An information processing method comprising the steps of:
receiving a personal identification code, the personal identification code being input by a user of an information processing apparatus via an operation unit;
generating a random number;
converting the received personal identification code by using a first predetermined function;

encrypting the generated random number by using the converted personal identification code for an encryption key;

encrypting print data by using the random number for an encryption key;

converting the converted personal identification code by using a second predetermined function, to yield a twice-converted personal identification code; and transmitting the encrypted random number, the twice-converted personal identification code and the encrypted print data to a print control apparatus via a network;

wherein both the converted personal identification code used by the random number encryption unit and the random number used by the print data encryption unit are internally generated and supplied without outside assistance.

7. A non-transitory computer-readable storage medium which stores a computer program for causing a computer to execute an information processing method, said computer program comprising:

a code reception module for receiving a personal identification code, the personal identification code being input by a user of an information processing apparatus via an operation unit;

a random number generation module for generating a random number;

a code conversion module programmed to convert the received personal identification code by using a first predetermined function;

a random number encryption module for encrypting the generated random number by using the converted personal identification code for an encryption key;

a print data encryption module for encrypting print data by using the random number for an encryption key;

the code conversion module programmed to convert the converted personal identification code by using a second predetermined function, to yield a twice-converted personal identification code; and a transmission module programmed to transmit the encrypted random number, the twice-converted personal identification code and the encrypted print data to a print control apparatus via a network;

wherein both the converted personal identification code used by the random number encryption module and the random number used by the print data encryption module are internally generated and supplied without outside assistance.

* * * * *